United States Patent
Park et al.

(10) Patent No.: US 12,487,954 B2
(45) Date of Patent: Dec. 2, 2025

(54) COMPUTER COMMUNICATION DEVICE WITH INTER-DEVICE DATA COPYING

(71) Applicant: SAMSUNG ELECTRONICS CO., LTD., Suwon-si (KR)

(72) Inventors: Sungjoon Park, Suwon-si (KR); Mincheol Kang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 76 days.

(21) Appl. No.: 18/612,360

(22) Filed: Mar. 21, 2024

(65) Prior Publication Data

US 2025/0061074 A1 Feb. 20, 2025

(30) Foreign Application Priority Data

Aug. 17, 2023 (KR) .......................... 10-2023-0107806

(51) Int. Cl.
*G06F 13/28* (2006.01)
*G06F 3/06* (2006.01)

(52) U.S. Cl.
CPC ............ *G06F 13/28* (2013.01); *G06F 3/0604* (2013.01); *G06F 3/0638* (2013.01); *G06F 3/0655* (2013.01); *G06F 3/0679* (2013.01); *G06F 2213/28* (2013.01)

(58) Field of Classification Search
CPC ...... G06F 13/28; G06F 3/0604; G06F 3/0638; G06F 3/0655
See application file for complete search history.

(56) References Cited

U.S. PATENT DOCUMENTS

| | | | | |
|---|---|---|---|---|
| 10,452,279 | B1* | 10/2019 | Malwankar | G06F 3/0659 |
| 2010/0070731 | A1* | 3/2010 | Mizuno | G06F 1/3268 |
| | | | | 711/170 |
| 2022/0138058 | A1* | 5/2022 | Govindarajan | G06F 13/404 |
| 2022/0147476 | A1 | 5/2022 | Nam et al. | |
| 2022/0217085 | A1 | 7/2022 | Sankar et al. | |
| 2022/0342835 | A1* | 10/2022 | Kim | G06F 13/28 |

(Continued)

FOREIGN PATENT DOCUMENTS

| | | |
|---|---|---|
| CN | 116483259 A | 7/2023 |
| KR | 10-2021-0147871 A | 12/2021 |
| KR | 10-2022-0090853 A | 6/2022 |

OTHER PUBLICATIONS

Gouk, Donghyun, et al. "Memory Pooling With CXL." IEEE Micro 43.2 (2023): 48-57.

(Continued)

*Primary Examiner* — Zachary K Huson
(74) *Attorney, Agent, or Firm* — NSIP Law

(57) ABSTRACT

A computer networking device includes a plurality of ports, a memory, and a computing unit. The computing unit receives source information and destination information for a snapshot from the host; obtains a read-value of a memory area corresponding to the source information in a memory device through a port identified based on mapping information and the source information; and transmit, to a storage device, the read-value based on peer-to-peer communication for a write operation of writing in a memory area corresponding to the destination information in the storage device through a port identified based on the mapping information and the destination information.

29 Claims, 12 Drawing Sheets

(56) References Cited

U.S. PATENT DOCUMENTS

| | | |
|---|---|---|
| 2022/0398207 A1 | 12/2022 | Norrie et al. |
| 2023/0035096 A1 | 2/2023 | Gangadharan et al. |
| 2023/0036751 A1 | 2/2023 | Guim Bernat et al. |
| 2023/0144038 A1 | 5/2023 | Sutardja |

OTHER PUBLICATIONS

Sharma, Debendra Das. "Novel Composable and Scaleout Architectures Using Compute Express Link." IEEE Micro 43.2 (2023): 9-19.

Extended European search report issued on Jul. 19, 2024, in counterpart European Patent Application No. 24152755.5 (12 pages).

\* cited by examiner

COMPUTER COMMUNICATION DEVICE WITH INTER-DEVICE DATA COPYING

CROSS-REFERENCE TO RELATED APPLICATIONS

This application claims the benefit under 35 USC § 119(a) of Korean Patent Application No. 10-2023-0107806 filed on Aug. 17, 2023, in the Korean Intellectual Property Office, the entire disclosure of which is incorporated herein by reference for all purposes.

BACKGROUND

1. Field

The present disclosure relates to a computer networking device and method for an in-memory database (DB).

2. Description of Related Art

In typical databases (DBs), operations including queries, insertions, deletions, and modifications on data stored on hard disks are performed through disk input/output interfaces. For a typical DB, a solid-state disk (SSD) is used instead of a hard disk drive (HDD), and an improvement of performance of the disk (e.g., a non-volatile storage device) has improved the input/output performance. However, computing performance has developed faster than disk performance, and the input/output performance of the disk has become a bottleneck in a DB system, even when an SSD is used.

Therefore, an in-memory DB has been used as a DB for real-time processing and various high performance scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a computer communication device includes: ports connected to a host, a storage device belonging to a same virtual layer as the host, and a memory device; a memory storing mapping information indicating associations between the ports and host-managed device memory (HDM) addresses; and a computing unit configured to: receive, from the host, source information and destination information for copying data; based on the mapping information and the source information; obtain a read-value of a memory area corresponding to the source information from the memory device through a port identified; and transmit the obtained read-value for a write operation of writing in a memory area corresponding to the destination information in the storage device, based on peer-to-peer communication, to the storage device through a port identified based on the mapping information and the destination information.

The computer communication device may be configured to establish compute express link (CXL)-based connectivity for the host, the memory device, and the storage device.

The computing unit may include: a controller configured to determine the port, among the ports, from source information including an HDM address and determine a second port from destination information including an HDM address, based on the mapping information; and a direct memory access (DMA) engine configured to perform DMA by transmitting the source information to the first port identified by the controller, obtaining the read-value from the memory device, and transmitting the read-value along with the destination information to the second port identified by the controller.

The computing unit may be further configured to: transmit the read-value to the storage device to cause the write operation of writing the read-value in the storage device without the host receiving the read-value.

The computing unit may be further configured to: not transmit the read-value to the host; and transmit the read-value directly to the storage device.

The memory device may store an in-memory database (DB) that includes the read-data, and wherein the computing unit is further configured to: receive, from the host, source information and destination information about a portion that is modified compared to a previous snapshot of the in-memory DB.

The computer communication device may be further configured to receive, from the host, single source information and single destination information for each of portions that are modified compared to a previous snapshot of an in-memory DB stored in the memory device.

The computing unit may be further configured to: transmit only once, to the memory device and the storage device, source information and destination information of a portion with multiple modifications to a previous snapshot of an in-memory DB stored in the memory device.

The computer communication device may be configured to: establish CXL protocol-based connectivity to a plurality of hosts including the host, a plurality of memory devices including the memory device, and a plurality of storage devices including the storage device; and form a virtual layer for each of root ports of the hosts, respectively.

The source information may include a source HDM address in a memory address space of a system memory of the host, and the destination information may include a destination HDM address in the memory address space of the system memory of the host.

In another general aspect, a computing system includes: a host; a storage device belonging to a same virtual layer as the host; a memory device storing an in-memory database (DB), the memory device belonging to the virtual layer; and a computer communication device configured to process a data transfer between the memory device and the storage device, wherein the memory device and the storage device are connected with each other and the host through ports of the computer communication device, wherein the computer communication device is configured to: receive, from the host, source information and destination information for a snapshot; determine that a first of the ports is associated with the source information in mapping information that includes associations between the ports and host-managed device memory (HDM) addresses; obtain a read-value of a memory area corresponding to the source information from the memory device through the determined first port; determine that a second of the ports is associated with the destination information in the mapping information; and transmit the read-value for a write operation of writing in a memory area, in the storage device, that corresponds to the destination information, wherein the transmitting is based on peer-to-peer communication, to the storage device through the determined second port.

The host, the storage device, and the memory device may be configured to communicate with the computer communication device through a compute express link (CXL)-based protocol, wherein the source information and destination information are received via CXL communication, and wherein the read-value is obtained and transmitted via CXL communications.

The computer communication device may be further configured to: determine the first port from an HDM address of the source information and determine the second port from an HDM address of the destination information, based on corresponding associations in the mapping information; transmit the source information to the first port and obtain the read-value from the memory device; and transmit the read-value along with the destination information to the second port to perform direct memory access (DMA).

The computer communication device may be further configured to: transmit the read-value to the storage device to cause the write operation of writing the read-value in the storage device without the host receiving the read-value.

The computer communication device may be further configured to: not transmit the read-value to the host; and transmit the read-value directly to the storage device.

The host may be further configured to: transmit, to the computer communication device, source information and destination information about a portion that is modified compared to a previous snapshot.

The host may be configured to: transmit, to the computer communication device, single source information and single destination information for each of portions that are modified compared to a previous snapshot.

The computer communication device may be a CXL switch and the host, the computer communication device, the memory device, and the storage device may all be part of a CXL virtual layer having a root port corresponding to the host.

The computer communication device may be further configured to: establish CXL protocol-based connectivity for a set of hosts that includes the host, a set of memory devices that includes the memory device, and a set of storage devices that includes the storage device; and form virtual layers for root ports of the hosts, respectively, in the set of hosts.

In another general aspect, a method performed by a computing unit includes: receiving, from a host, source information and destination information for a data copy, the host belonging to a same virtual layer as a memory device and a storage device; obtaining a read-value of a memory area corresponding to the source information from the memory device through a port identified based on the source information and mapping information between ports of a computer communication device and host-managed device memory (HDM) addresses; and transmitting the read-value for a write operation of writing in a memory area corresponding to the destination information in the storage device, based on peer-to-peer communication, to the storage device through a port identified based on the mapping information and the destination information.

In yet another aspect, a computer communication system includes: a first communication switch connected to a memory device, and configured to obtain source information and destination information for a data copy requested by a host, obtain a read-value of a memory area corresponding to the source information in the memory device through a port identified based on the source information, and transmit the read-value and the destination information to a second communication switch; and the second communication switch connected to a storage device, and configured to receive the read-value and the destination information and transmit the read-value for a write operation of writing in a memory area corresponding to the destination information in the storage device to the storage device through a port identified based on the destination information.

The first communication switch may be further configured to: transmit the read-value and the destination information to the second communication switch in response to an unsuccessful translation of the destination information.

The first communication switch may be further configured to: request reading a value of the memory area corresponding to the source information using a direct memory access (DMA) engine.

The second communication switch may be further configured to: transmit the read-value toward the storage device corresponding to the destination information in response to a successful translation of the destination information by the second communication switch.

The computer communication system may further include: one or more third communication switches connected between the first communication switch and the second communication switch.

Each of the one or more third communication switches may be configured to: in response to an unsuccessful translation of the destination information, transmit the read-value and the destination information to another of the third communication switches.

The computer communication system may be further configured to: establish a compute express link (CXL)-based protocol via the plurality of communication switches for the host, the memory device, and the storage device.

The first communication switch may be further configured to: transmit the read-value to the other communication switch to cause the write operation of writing the read-value in the storage device without computing by the host.

The computer communication system may be further configured to: not transmit the read-value to the host; and repeat transfers of addresses and values between communication switches until the read-value is transmitted to the storage device.

Other features and aspects will be apparent from the following detailed description, the drawings, and the claims.

Figure 1:
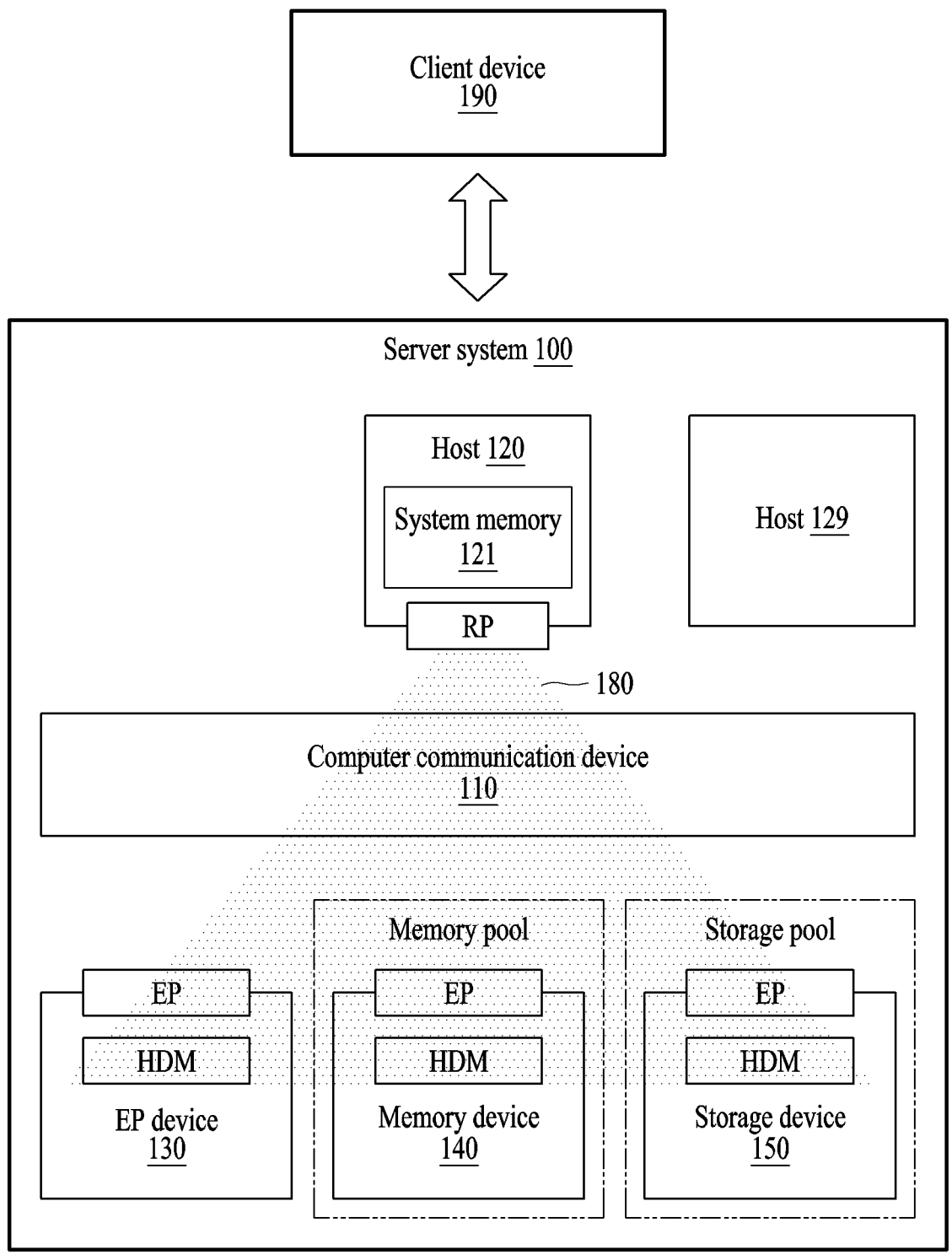
FIG. 1 illustrates an example server system according to one or more example embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example server system according to one or more example embodiments.

According to an example embodiment, a server system 100 (e.g., a computing system) may include a host 120, a computer communication device 110, and one or more endpoint (EP) devices 130. The server system 100 may operate on multiple hosts. In the example of FIG. 1, the server system 100 may include a plurality of hosts (e.g., hosts 120 and 129). The communication devices described herein may also be referred to as "networking devices", as some examples may handle network communications, some may handle bus communications, some may handle both bus communications and network communications. The communication devices may be implemented as switches, fabric nodes, or the like. Similarly, although the term "computer network" is used herein, the term also refers to bus communications (e.g., similar to PCIe communications), and in that sense the term "network" is used herein with the broadest meaning. For example, a serial/bus communication system for communication amongst a host and peripheral devices can be considered a "network".

The EP devices 130 may each be a physical device that is connected to a computer network and that exchanges information via the computer network. A memory device 140 (e.g., a dynamic random-access memory (DRAM) device) and a storage device 150 (e.g., a solid-state disk (SSD)) are described herein as main examples of the EP devices 130. One or more memory devices 140 (e.g., volatile storage devices) may be formed into a memory pool, and one or more storage devices 150 (e.g., non-volatile storage devices) may be formed into a storage pool.

According to an example embodiment, among the EP devices 130, a device that supports a Compute Express Link (CXL) protocol (e.g., CXL 2.0, 3.0, etc.) may be referred to as a CXL device. From the perspective of the host 120, a CXL protocol is an interconnect standard, similar to and based on PCIe, that enables various exchanges (typically, with cache coherency) between CXL-compliant devices such as accelerators memory devices and a host, e.g., a CXL host 120. CXL is a technology that allows computing servers to use a memory pool as a memory, supports memory semantic load/store commands, but with latency on the order of microseconds.

A CXL device may support one or more CXL protocols, for example a peripheral component interconnect express (PCIe) based interface (CXL.io protocol), a memory operation (CXL.mem protocol), or a cache operation (CXL.cache). The operations supported by a CXL device may vary depending on the type of CXL device, that is, which of the CXL protocols the CXL device supports. There are three CXL devices; type 1, type 2, and type 3, each of which supports CXL.io. For example, a type 3 CXL device supports CXL.mem operations for reading a memory through a CXL interface, but does not support CXL.cache. A CXL device of type 1 supports CXL.cache for operations that read a cache through a CXL interface, but does not support CXL.mem. A CXL device of type 2 may support both CXL.cache and CXL.mem for memory operations and cache operations as described above. The PCIe-based CXL.io interface/implementation of a CXL device may include functionality such as: configuration space access, base address register (BAR) mapping memory access used for registers and mailboxes, message signaled interrupts (MSI)/MSI-X, advanced error reporting (AER), data object exchange (DOE) mailbox, integrity, and data encryption (IDE), and various PCIe defined interfaces. The memory operations (CXL.mem) may include access, read, and write performed on a memory. The memory device 140 and the storage device 150 described above may be type 3 CXL devices. For the storage pool, a type 2 CXL device may also be used. Operations in the computer network where a CXL-based protocol (or a CXL protocol herein) is established are mainly described herein.

The host 120 and EPs connected through the CXL protocol may form a virtual layer 180 (or a virtual hierarchy (VH)) as indicated by the shaded area of FIG. 1. The virtual layer 180 may include components below a root port ("RP" in FIG. 1) of the host 120, including the root port. The components below the root port may include the root port and the EP devices 130.

The root port, which is a central point of CXL connectivity, may be an entry point of the virtual layer 180 formed by the CXL protocol. The root port may be connected to the host 120 (e.g., a host processor) and may act as a bridge between the host processor and other CXL devices in the system. The root port may provide the host processor with a primary interface for communicating with the other CXL devices. The root port may manage CXL transactions that handle memory access, coherency, and data transmission between the host 120 and a CXL device. The root port may also control enumeration and configuration processes to discover and initialize a CXL device in the system. The configuration process of a CXL device is described in detail below with reference to FIG. 3.

EP devices connected to the same root port may belong to the same virtual layer 180. The EP devices may be connected to the host 120 via the computer communication device 110 through their respective Endpoint Ports.

In addition, the host 120 may recognize a host-managed device memory (HDM) area (hereinafter "HDM area") for the EP devices 130 belonging to the same virtual layer 180. The HDM area may be a memory area managed by the host 120 among memory areas provided by respective EP devices 130 or a combination of the EP devices 130. The CXL virtual layer 180 may have a structure of an HDM area made available via (and including) a root port of the host 120, an EP port of a CXL device, and the host 120. The computer communication device 110 (e.g., a CXL switch or a CXL fabric) may be positioned between the root port of the host 120 and the CXL device. In the case of a CXL switch, the switch may be a hybrid PCIe/CXL switch which provides both PCIe and CXL connectivity. Accordingly, the host 120 may access, read, and write in an HDM area of EP devices (e.g., the memory device 140 and the storage device 150) belonging to the same virtual layer 180, via the computer network device 110. For example, the host 120 may use CXL.mem to directly access memories on a PCIe bus as though the memories were local memories of the host 120. That is, an HDM area may have a same memory address space, possibly spanning multiple CXL devices, but managed by the host 120.

According to an example embodiment, the host 120 may provide an in-memory based database (DB) (hereinafter "in-memory DB") through the EP devices 130 connected through the computer communication device 110. For example, based on a request by a client device 190 for an operation that may be a query, an insertion, a deletion, or a modification on the in-memory DB, the host 120 of the server system 100 may perform the operation. However, examples are not limited thereto, and the host 120 may independently perform a query, an insertion, a deletion, or a modification operation. The host 120 may include a system memory 121. The system memory 121, which is a memory used to operate the system of the host 120, may store information (e.g., BAR information of an EP device, a memory area set for an EP device, or a range of the set memory area) for managing EP devices, according to an example embodiment.

The in-memory DB may be a DB in which a main storage device configured to store and manage data of the DB is implemented as a volatile storage device (e.g., the memory device 140). In the in-memory DB, data may be stored and managed in a memory (e.g., a volatile storage device) without input/output to/from a disk (e.g., a non-volatile storage device). The in-memory DB may be implemented as, for example, a Redis (or a remote dictionary storage) DB or a Memcached DB. The in-memory DB may store and manage large amounts of data. The server system 100 may use a disaggregated memory pool system to provide greater memory capacity and improved scalability to the in-memory DB. The disaggregated memory pool system may be a system in which hosts (e.g., computing servers) access and share a separately disaggregated large memory pool. In the disaggregated memory pool system, the entire memory of the memory pool may be exposed to each computing server to be used. The server system 100 may use the disaggregated memory pool system to have increased effective memory capacity and easy scalability for large-scale memory configuration.

However, as described above, the main storage device is a volatile storage device, and thus if the power of a computing system (e.g., the server system 100) providing the in-memory DB (or memory thereof) is unintentionally turned off, there may be a risk of losing all data in the memory. According to an example embodiment, the server system 100 may preserve, in a non-volatile storage device (e.g., the storage device 150), data of the in-memory DB that is stored in a volatile storage device. The host 120 may generate a command for a snapshot of the in-memory DB. The computer communication device 110 may receive the command for the snapshot from the host 120. As the computer communication device 110 processes operations for taking the snapshot of the in-memory DB, it may prevent a data loss in the server system 100 serving the in-memory DB. The snapshot may be an operation of capturing a file system of a DB at an arbitrary point in time and retaining it. A captured snapshot may be used to reconstitute the snapshotted DB and make it available for operation with a state corresponding to the state of the snapshotted DB when the snapshot was taken.

The storage device 150 may be (or be part of) an EP device 130 for the in-memory DB belonging to the same virtual layer 180 as the host 120. The memory device 140 may be (or be part of) an EP device 130 for an in-memory DB cache belonging to the virtual layer 180. The computer communication device 110 may process a data transfer between the memory device 140 and the storage device 150 connected based on the host 120, through a plurality of CXL ports. The computer communication device 110 may be, but is not limited to, a CXL switch or a CXL fabric.

According to an example embodiment, the host 120 in the server system 100 may store, in a non-volatile storage device (e.g., the storage device 150), entire data stored in a volatile storage device (e.g., the memory device 140), based on a snapshot. The preserved snapshot-based data may all be stored and/or preserved in the form of a binary file in the storage device 150. The host 120 may generate a command for taking snapshots such that a snapshot is performed at predetermined time intervals.

For example, the computer communication device 110 in the server system 100 may provide a preserved copy (e.g., a snapshot) of the in-memory DB through peer-to-peer communication. A peer may be an EP device 130, for which the memory device 140 and the storage device 150 are described herein as main examples, but examples thereof are not limited thereto. The computer communication device 110 may process operations accompanying a snapshot of the in-memory DB by providing peer-to-peer communication between the memory device 140 and the storage device 150. The computer communication device 110 may perform peer-to-peer communication based on the CXL protocol. The computer communication device 110 may, by inter-port switching/routing functionality, provide peer-to-peer communication between EP devices (e.g., the memory device 140 and the storage device 150) belonging to the same virtual layer 180 based on a port of the host 120. FIG. 1 shows an example virtual layer (e.g., the virtual layer 180) corresponding to the host 120, which includes an EP device (e.g., the EP devices 130), a memory device (e.g., the memory device 140), and a storage device (e.g., the storage device 150). For example, the computer communication device 110 may improve the persistence of the in-memory DB through direct memory access (DMA) between the memory pool and the storage pool. The CXL 3.0 protocol, for example, supports DMA for CXL devices, and the aforementioned DMA between memory and storage may be performed by CXL devices (e.g., memory and storage devices) that conform to CXL 3.0 (or any other suitable CXL version). A value read from a memory area of the memory device 140 may be transferred directly to the storage device 150 without passing through the host 120, and thus intervention of the host 120 may be minimized, which may improve the speed of the transfer and reduce load on the host 120.

For example, in a first comparative example snapshotting embodiment, the host 120 may, for each snapshot, individually access all values of an in-memory DB stored in a volatile memory to read and write the values for the snapshot. In the first comparative example snapshotting embodiment, the host 120 processes individual values and requires a great amount of time for a snapshot, and thus there may be a relatively long snapshot cycle. In contrast, according to another example snapshotting embodiment, the computer communication device 110 may process operations for a snapshot with a reduced load due to a minimized intervention of the host 120 and may thus provide an in-memory DB that is used with a real time level of performance and that has a short snapshot cycle, thus reducing the risk of losing the latest data.

Additionally, in the first comparative example snapshotting embodiment, remote DMA (RDMA) may be used as an interconnection technology for connecting a computing server (e.g., the host 120) and the memory pool. Such an RDMA technology may support DMA from one server node to a memory of another server node through a high-speed network having high throughput and low latency. The RDMA may allow a data transfer between a local memory and a remote memory without the use of a central processing unit (CPU) and may thus be used as the interconnection technology for the memory pool. However, RDMA may require a specialized hardware device such as an RDMA network interface card (RNIC) to remove/bypass a network software stack. In contrast, according to another example snapshotting embodiment, in the server system 100 (e.g., a computing system), the computer communication device 110 may process operations for capturing a snapshot, and thus the host 120 and CXL devices may not require RNICs.

Further, in the first comparative example snapshotting embodiment, a memory area to be used for RDMA remote data transfer may be defined in each of a local memory and a remote memory. A device driver of the RNIC executing on the host 120 may check a physical address of the defined memory area and store, in a memory translation table (MTT), a virtual address and a physical address corresponding to the virtual address. Using RDMA may require a memory copy in each server and a process of pre-registering a memory area for the RDMA. In contrast, according to another example snapshotting embodiment, in a case of a snapshot by the computer communication device 110, a value to be preserved does not pass through the host 120, and thus an address space of the host 120 may be unnecessary. Accordingly, the computer communication device 110 may process operations for performing a snapshot of the in-memory DB, using reduced host memory usage, copy overhead, and memory area configuration overhead.

Figure 2A:
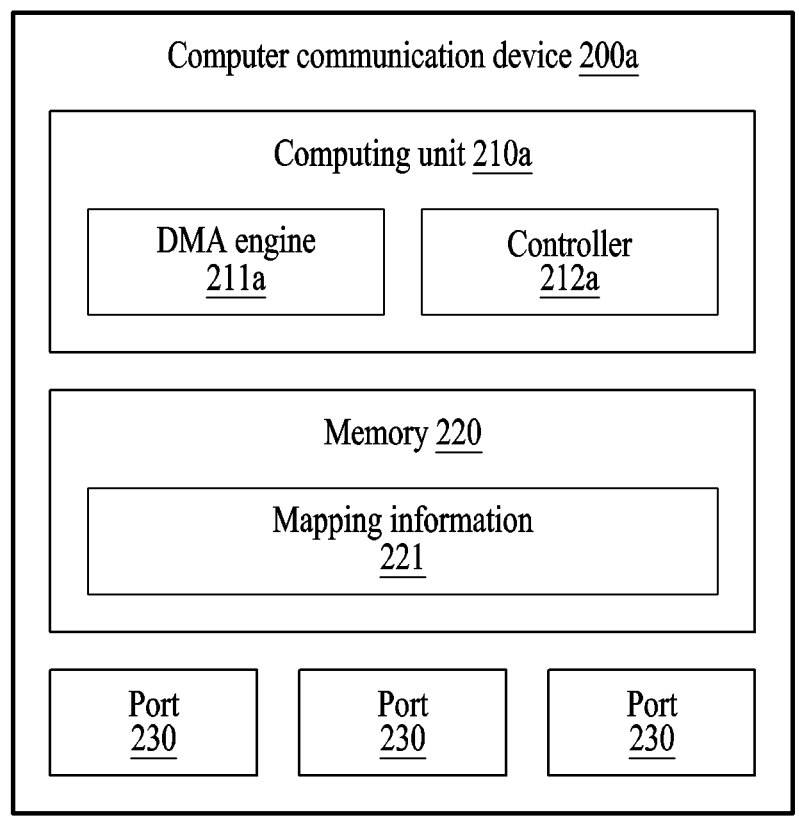
FIGS. 2A and 2B illustrate example configurations of a computer communication device according to one or more example embodiments.
Figure 2B:
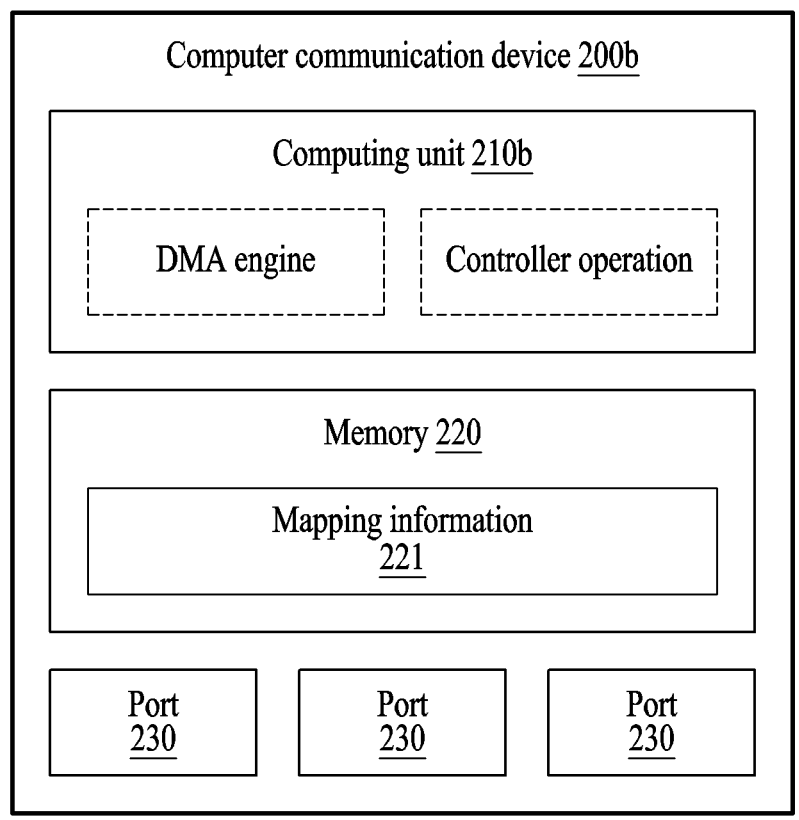

FIGS. 2A and 2B illustrate example configurations of a computer communication device according to one or more example embodiments.

Referring to FIG. 2A, a computer communication device 200a may include a computing unit 210a, a memory 220, and ports 230. The computer communication device 200a, which is a device supporting a CXL protocol, may be a CXL switch or a CXL fabric, for example.

The computing unit 210a may process operations for taking a snapshot. The computing unit 210a may translate a packet (e.g., a snapshot request) received from a host and forward it to a corresponding EP device (e.g., a memory device and/or a storage device). The translation may be altering of addresses (e.g., a source address and/or a destination address) according to an address system of the system memory in the packet into addresses according to an address system of the EP device. The computing unit 210a may include a DMA engine 211a and a controller 212a. The DMA engine 211a may provide peer-to-peer communication between a memory device and a storage device. The DMA engine 211a may implement a part of a CXL protocol and an existing DMA engine may be used/adapted. The controller 212a may execute firmware for operations including taking a snapshot.

For example, the DMA engine 211a of the computing unit 210a may receive source information and destination information for the snapshot from the host. A request for the snapshot (or a snap request) may include the source information and the destination information. The source information may include an address (e.g., a source address) where a value to be read for the snapshot is positioned. The destination information may include an address (e.g., a destination address) indicating a position where the read-value is to be preserved (e.g., written) for the snapshot. As will be described below, a value identified in an area indicated by the source address may be written into an area indicated by the destination address. With an in-memory DB, a value in a memory device may be preserved in a storage device, the source address may indicate an address in an HDM area of the memory device, and the destination address may indicate an address in an HDM area of the storage device. That is, the HDM areas may be units of memory/storage that can be referred to wholesale for operations thereon, thus, "address" should be taken as having a wider meaning than merely a specific location in memory. Rather, an HDM "address" may be any information that identifies a particular HDM area. For reference, the addresses of the source information and the destination information received from the host may follow an address system of a system memory of the host. The source information may include a source HDM address according to the system memory of the host. The destination information may include a destination HDM address according to the system memory of the host. That is, the source address may be an address indicating a position in the HDM area of the memory device from the perspective of the system memory of the host. The destination address may be an address indicating a position in the HDM area of the storage device from the perspective of the system memory of the host.

The controller 212a may receive the source information and the destination information from the DMA engine 211a. The controller 212a may identify the ports 230 based on mapping information 221, the source information, and the destination information. The mapping information 221 may be stored in the memory 220 of the computer communication device 200a. The mapping information 221 may include information (e.g., a mapping table) indicating a relationships between ports (e.g., the ports 230) and HDM addresses. That is, the mapping information 221 may indicate which ports are associated with which HDM addresses. For example, the mapping information 221 may be an address translation table that is obtainable from a configuration shown in FIG. 3. The controller 212a may use the mapping information 221 of the memory 220 to identify a port to which the memory device corresponding to the source information is connected. Similarly, the controller 212a may use the mapping information 221 to identify a port to which the storage device corresponding to the destination information is connected.

The DMA engine 211a of the computing unit 210a may obtain a read-value of a memory area corresponding to the source information in the memory device through the port identified based on the mapping information 221 and the source information. The DMA engine 211a may transmit a request for reading the memory area corresponding to the source address to the memory device through the port identified by the controller 212a. The DMA engine 211a may receive the value corresponding to the source address from the memory device.

The DMA engine 211a of the computing unit 210a may transmit the read-value to the storage device through CXL peer-to-peer communication for a write operation of writing in the memory area corresponding to the destination information in the storage device through the port identified based on the mapping information 221 and the destination information. The DMA engine 211a may request the write operation (using the value read from the memory area) to the port indicated by the destination address without passing the value read through the host.

The ports 230 may be connected to the host, the storage device (for the in-memory DB) belonging to the same virtual layer as the host, and the memory device (for an in-memory DB cache) belonging to the virtual layer.

Although an example computing unit (e.g., the computing unit 210a) including a DMA engine (e.g., the DMA engine 211a) and a controller (e.g., the controller 212a) is mainly described with reference to FIG. 2A, examples are not limited thereto. A computer communication device 200b shown in FIG. 2B may include a computing unit 210b implemented with operations of a DMA engine and operations of a controller being integrated. That is, the computing unit 210b may be configured to perform DMA and mapping operations but may have a different structure than the computing unit 210a; the operations may not be implemented in distinct units as in the computing unit 210a but rather may be integrated into various operations of the computing unit 210b. The other components such as a memory (e.g., the memory 220) and ports (e.g., the ports 230) are the same as or similar to those shown in FIG. 2A. The operations of the DMA engine 211a described above may also be performed by the computing unit 210b of FIG. 2B.

Figure 3:
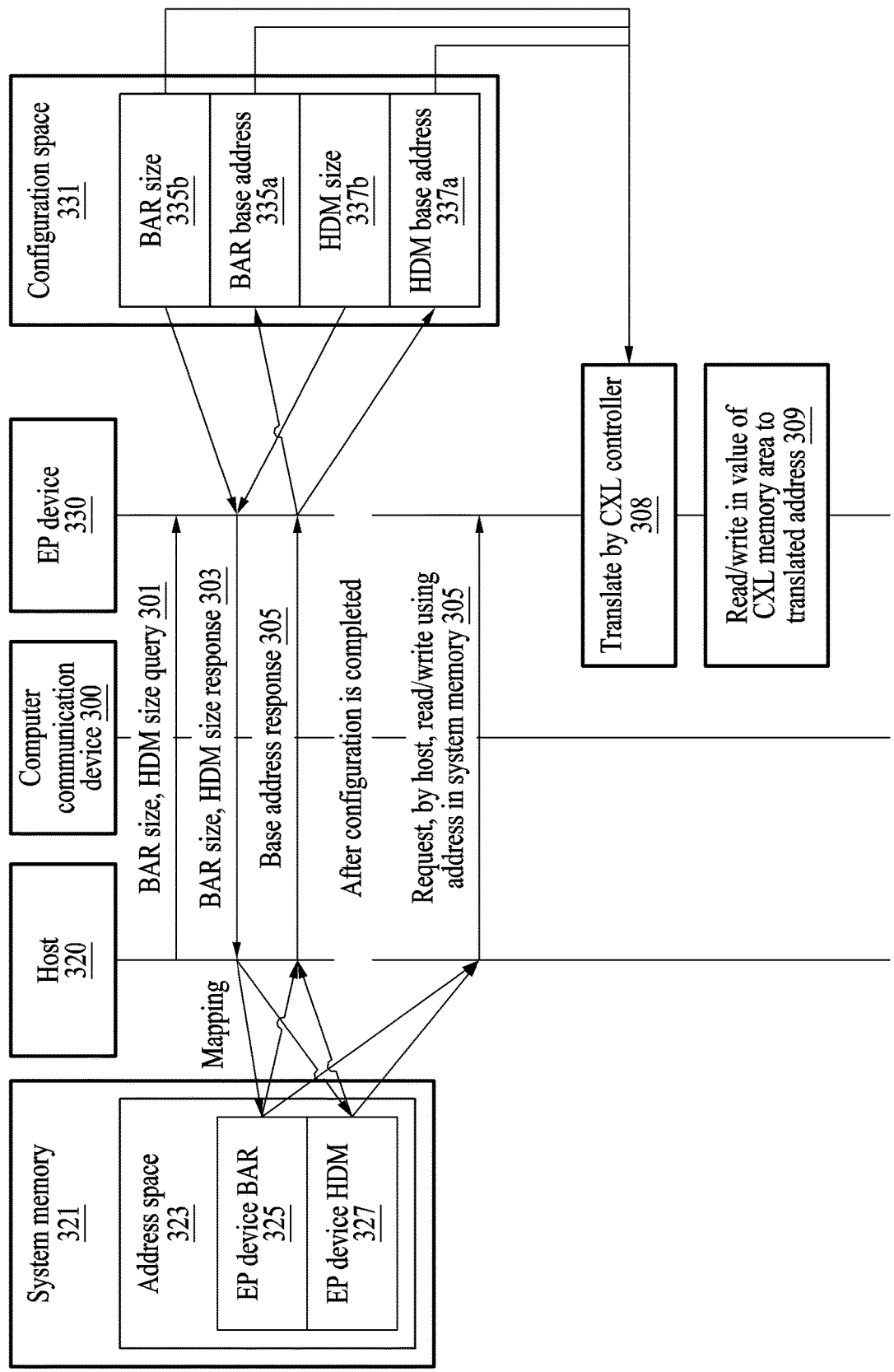
FIG. 3 illustrates an example operation of a server system configuring itself to use a host-managed device memory (HDM) according to one or more example embodiments.

FIG. 3 illustrates an example operation of a server system configuring itself to use an HDM according to one or more example embodiments.

According to an example embodiment, a server system (e.g., a computing system) may include a host 320, a computer communication device 300, and an EP device 330. The host 320 may recognize EP devices 330 connected to a root port. For example, a kernel driver of the host 320 may perform enumeration on CXL devices among the EP devices 330 connected to the root port. For example, one or more CXL devices may be directly or indirectly connected to a PCIe root port of the host 320. According to an example embodiment, a CXL device may be connected to the root port of the host 320 via the computer communication device 300.

In operation 301, the host 320 may make a query to the EP device 330 about the size of a BAR and the size of an HDM (any arbitrary HDM). The BAR may be a register that specifies an input/output interface used by the EP device 330 and a type and position of a memory space. The HDM may be a memory area in the memory space of the EP device 330 (e.g., a CXL device) which is managed by the host 320, as described above.

In operation 303, the EP device 330 may provide the host 320 with its BAR size 335b and its HDM size 337b as a response. The BAR size 335b and the HDM size 337b may be determined according to a configuration space 331. The host 320 may map BAR addresses and HDM addresses in a system memory area of the host 320 using the BAR size 335b and the HDM size 337b which are a result of the query.

The host 320 may allocate an EP device BAR 325 and an EP device HDM 327 into an address space 323 of a system memory 321.

In operation 305, the host 320 may provide the EP device 330 with a base address as a response (to receiving BAR size 335b and HDM size 337b at operation 303). A BAR base address 335a may indicate a position to which the EP device BAR 325 is allocated in the system memory 321 of the host 320. An HDM base address 337a may indicate a position to which the EP device HDM 327 is allocated in the system memory 321 of the host 320. The EP device 330 may store, in the configuration space 331, the BAR base address 335a and the HDM base address 337a along with the BAR size 335b and the HDM size 337b.

When configuration according to the operations 301, 303, and 305 described above is completed, an HDM area of the EP device 330 may be shown/known to the host 320. The host 320 may then access the HDM area of the EP device 330 using the EP device BAR 325 and the EP device HDM 327 allocated in the system memory 321.

For example, in operation 305, the host 320 may request read/write using an address in the system memory 321. The host 320 may access data (e.g., data values stored in a DRAM of a CXL device) of the EP device 330 (e.g., the CXL device) through a load or store command (e.g., a load/store command) for an address in an area corresponding to the EP device HDM 327 allocated in the system memory 321.

In operation 308, the EP device 330 may translate an address received by a CXL controller. The address transmitted to the EP device 330 of a memory pool or a storage pool is an address that follows a system of the system memory 321 of the host 320 (i.e., is in system address space), and it may thus be different from an actual address (e.g., a physical DRAM address inside a memory device) inside the EP device 330. The address in the area corresponding to the EP device HDM 327 that follows the system of the system memory 321 is referred to herein as a host HDM address. As described with reference to FIG. 4, each pool (e.g., the memory pool or the storage pool) may further include a CXL controller for address translation (or address conversion) of the host HDM address for the corresponding pool. The CXL controller of a pool may translate the host HDM address into a device HDM address based on the BAR base address 335a, the BAR size 335b, and the HDM base address 337a. The device HDM address, which is an actual address (e.g., a DRAM address) of a memory area set as the HDM area in the EP device 330, may follow an address system of the EP device 330.

In operation 309, the EP device 330 may read or write a value of a position corresponding to the translated address in the CXL memory area.

Additionally, the computer communication device 300 may construct mapping information based on at least some data collected from a data exchange between the host 320 and the EP device 330 in the configuration operation described with reference to FIG. 3. For example, the computer communication device 300 may map the host HDM address to a port number of a port to which a corresponding EP device 330 is connected. The computer communication device 300 may map the port number of the port connected to the EP device 330 to an address range of the EP device HDM 327 corresponding to the EP device 330.

Figure 4:
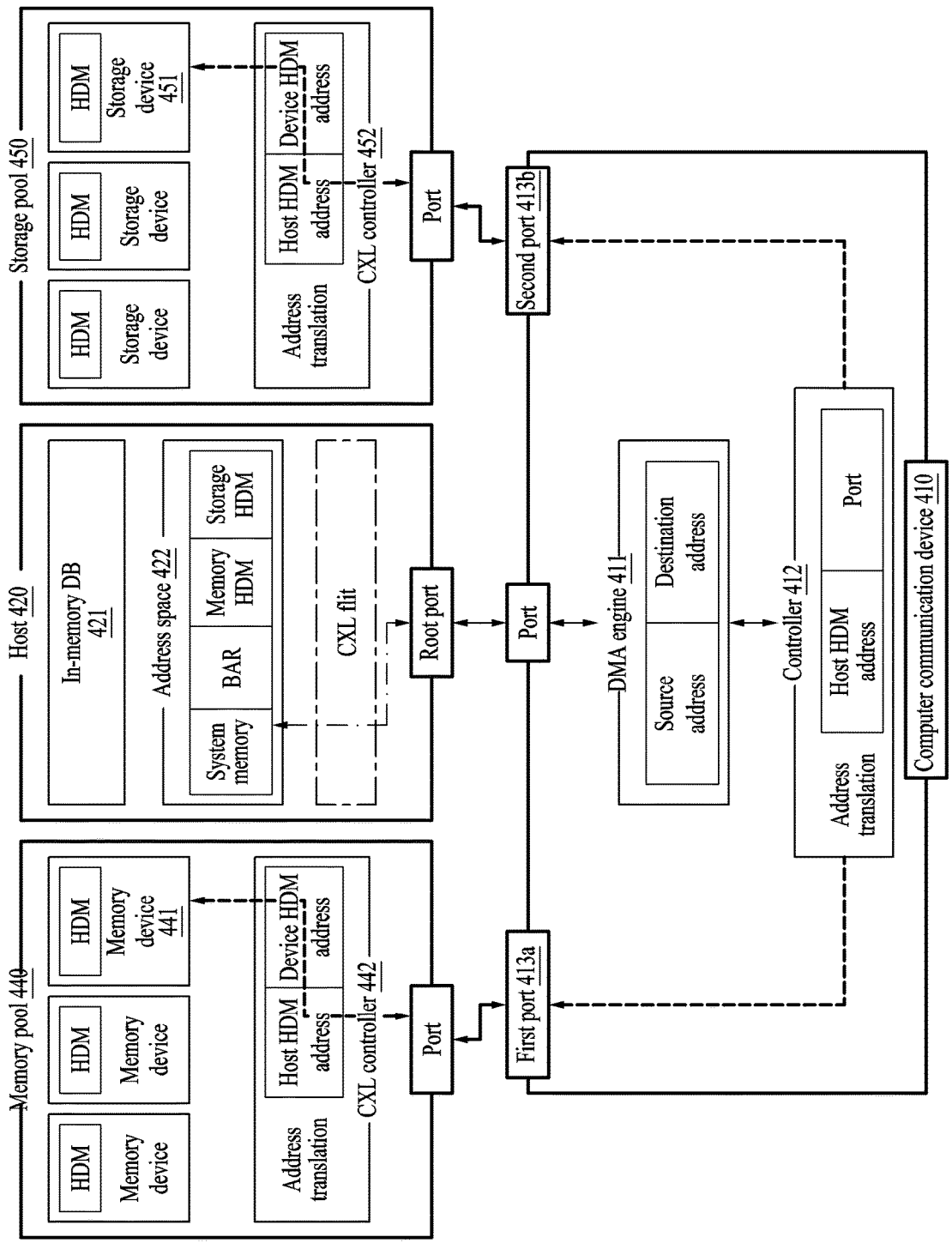
FIG. 4 illustrates an example computer communication device included in a server system for an in-memory database (DB) according to one or more example embodiments.
Figure 5:
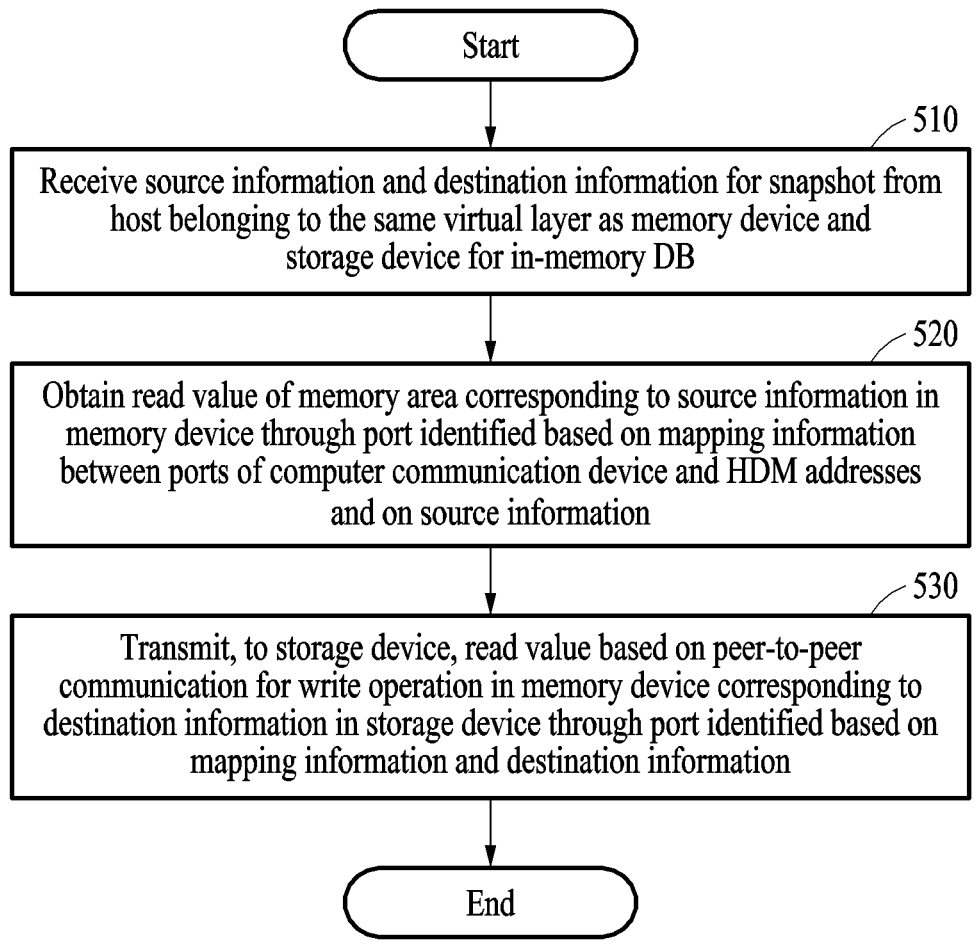
FIG. 5 illustrates an example snapshot method of an in-memory DB according to one or more example embodiments.

FIG. 4 illustrates an example computer communication device included in a server system for an in-memory DB according to one or more example embodiments. FIG. 5 illustrates an example snapshot method of an in-memory DB according to one or more example embodiments.

According to an example embodiment, a host 420 may implement an in-memory DB 421. The host 420 may be connected to EP devices to implement the in-memory DB 421. The host 420 may store data of the in-memory DB 421 (e.g., Redis) in a memory pool 440 and a storage pool 450. The host 420 may access the EP devices via a computer communication device 410 using a CXL flit (or a flow control unit). The CXL flit may have a fixed payload size.

To use a memory device 441 of the memory pool 440, the host 420 may specify an HDM area (for the memory device 441 of the memory pool 440) in a system memory of the host 420 (i.e., in host address space) as described above with reference to FIG. 3. Similarly, to use a storage device 451 of the storage pool 450, the host 420 may specify an HDM area (for the storage device 451) of the storage pool 450 in the system memory of the host 420 (i.e., in the host address space). The host 420 may store, in an address space 422 (host address space), information (e.g., information associated with the size and address) about the system memory, a BAR, a memory HDM, and a storage HDM. Accordingly, the host 420 may use the HDM area of the memory device 441 as a local memory and the HDM area of the storage device 451 as a local storage ("local" referring to the perspective of the host 420).

In a computing system, the computer communication device 410 may establish CXL protocol communication for the host 420 and the EP device. As described above, the CXL protocol may provide peer-to-peer communication between HDM areas of EP devices belonging to the same virtual layer. The memory device 441 and the storage device 451 are described as examples of EP devices with reference to FIG. 4.

FIG. 5 illustrates an example snapshot method of an in-memory DB according to one or more example embodiments.

Referring to FIG. 5, in operation 510, the computer communication device 410 may receive source information and destination information for a snapshot of the in-memory DB 421. The information may be received from the host 420, which belongs to the same virtual layer as the memory device 441 and the storage device 451. A computing unit of the computer communication device 410 may include a controller 412 and a DMA engine 411.

According to an example embodiment, the controller 412 may identify a port corresponding to a host HDM address using mapping information indicating a mapping relationship between host HDM addresses and ports. For example, the controller 412 may identify, among a plurality of ports of the computer communication device 410, a first port 413a (e.g., a source port) from an HDM address included in the source information (e.g., a source address), based on the mapping information. In the same way, the controller 412 may identify a second port 413b (e.g., a destination port) from an HDM address included in the destination information (e.g., a destination address) based on the mapping information. That is, the first port 413a is found by searching for the source address in the mapping information, and the second port 413b is found by searching for the destination address in the mapping information.

In operation 520, the computer communication device 410 may obtain a read-value of a memory area corresponding to the source information in the memory device 441 through a port identified based on the source information and mapping information between ports of the computer communication device 410 and HDM addresses. More specifically, the DMA engine 411 may transmit the source information to the first port 413a identified by the controller 412. A CXL controller 442 of the memory pool 440 may identify a device HDM address as one that is obtained by translating a host HDM address corresponding to the source information. The CXL controller 442 may read a corresponding value from the HDM area (of the memory device 441) corresponding to a device HDM address. The DMA engine 411 may obtain the read-value from the memory device 441 through the first port 413a.

In operation 530, the computer communication device 410 may transmit, to the storage device 451, the read-value based on CXL peer-to-peer communication for a write operation of writing in a memory area corresponding to the destination information in the storage device 451 through a port identified based on the mapping information and the destination information. The DMA engine 411 may perform DMA by transmitting the read-value, along with the destination information, to the second port 413b identified by the controller 412. More specifically, the DMA engine 411 may transmit the destination information and the value read from the memory device 441 to a CXL controller 452 of the storage pool 450 through the second port 413b. The CXL controller 452 may identify the device HDM address based on one obtained by translating the host HDM address corresponding to the destination information (i.e., by dereferencing the host HDM address). The CXL controller 452 may write the value read from the memory device 441 into the HDM area of the storage device 451 that corresponds to the device HDM address.

In the operations described above, the computing unit may transmit the read-value to the storage device 451 to cause the write operation (writing the read-value) in the storage device 451 without computing by the host 420, and in particular, without the host 420 having to dereference a memory location. The computing unit may not transmit the read-value to the host 420. Instead, the computing unit (e.g., the DMA engine 411) may transmit the read-value directly to the storage device 451. For example, in the CXL 3.0 standard, peer-to-peer communication is supported between HDMs of EP devices belonging to the same CXL virtual layer. Accordingly, the DMA engine 411 may provide DMA between the memory device 441 and the storage device 451 belonging to the same CXL virtual layer. The memory pool 440 and the storage pool 450 are connected through a CXL interface, and the host 420 may thus not need to receive data (e.g., a value of the memory device 441 to be preserved). Accordingly, after receiving the source information and the destination information from the host 420 in operation 510, the computer communication device 410 may preserve (copy) a data value corresponding to the source address into the destination address, without additional computing by the host 420. Once the host 420 specifies the source address having a value to be preserved and the destination address where the value is to be preserved, the computer communication device 410 may perform remaining operations for preserving the data value. Since processing for memory copy is unnecessary in the host 420, CPU utilization performance of the host 420 and tail latency may be improved.

For reference, apart from a snapshot, the host 420 may use a CXL.mem interface to use the memory device 441 of the memory pool 440 and/or the storage device 451 of the storage pool 450 as a local memory and/or a local storage. The CXL.mem interface may be processed through a CXL flit. Operations of the host 420, the memory pool 440, and the storage pool 450 for snapshots are described with reference to FIG. 6. Moreover, although the persisting of data from memory to storage is useful for an in-memory DB, the same technique may be used for any scenario where data in memory needs to be copied to storage.

Figure 6:
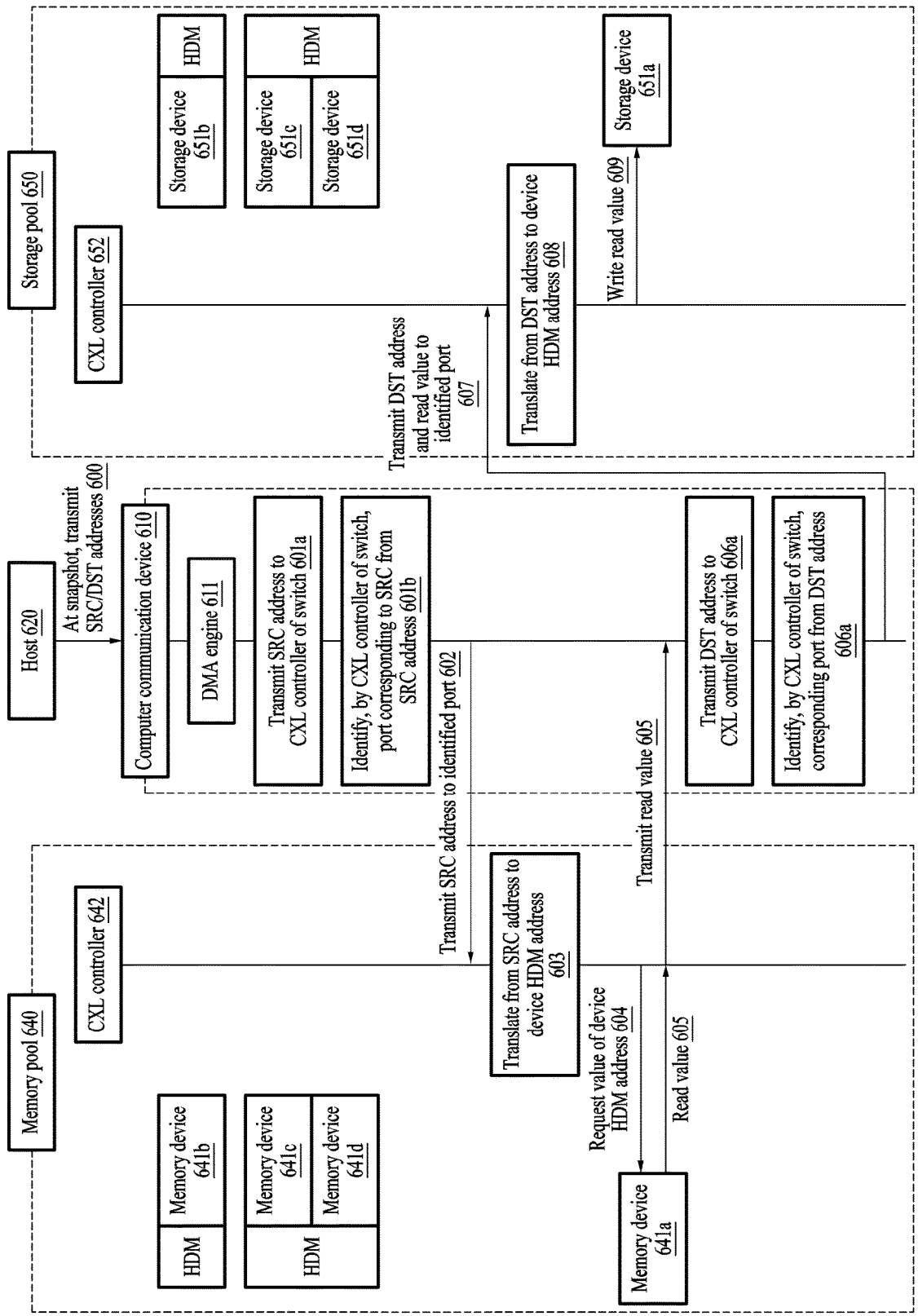
FIG. 6 illustrates an example snapshot method without the intervention of a host according to one or more example embodiments.

FIG. 6 illustrates an example snapshot method without the intervention of a host according to one or more example embodiments.

In operation 600, during a snapshot, a host 620 may transmit a source address (SRC address) and a destination address (DST address) to a computer communication device 610. The host 620 may determine (i) a position (e.g., the source address) of a value to be preserved in a memory pool 640 (or a memory device 641a) of an in-memory DB and (ii) a position (e.g., the destination address) at which the value is to be preserved in a storage pool 650 (or a storage device 651a). For reference, the source address and the destination address may be host HDM addresses.

When performing a snapshot of a predetermined range of the in-memory DB, the host 620 may identify source addresses for all data within the range and determine destination addresses respectively corresponding to the source addresses. The predetermined range may be a partial range or a full range of the in-memory DB. The host 620 may transmit, to the computer communication device 610, pairs of the source addresses and the destination addresses corresponding to data to be preserved, in sequential order or in batches. However, examples are not limited to performing a snapshot on all data in the range, and a snapshot (e.g., a partial snapshot) may also be performed only on a portion of data that is changed or modified compared to a previous snapshot. The partial snapshot will be described below with reference to FIGS. 7 and 8. Incidentally, each source-destination address pair forms the range. The term "range" refers to some part (or whole) of in-memory DB that consists of data. Each data corresponds to a single source-destination address pair. For example, if in-memory DB has 100 data, and only 10 data would be snapshotted, then the term "partial range" indicates the 10 data, and the host transmits 10 source-destination address pairs. The 10 source-destination pairs correspond to 10 data, which are subject to snapshotting, respectively. Similarly, in a 100 data snapshot scenario, then "full range" refers to this 100 data, and the host transmits 100 source-destination address pairs.

In operation 601a, a DMA engine 611 of the computer communication device 610 may transmit the source address to a CXL controller (e.g., a CXL switch) of the computer communication device 610. In operation 601b, the CXL controller may identify a port corresponding to a source from the source address. For example, the CXL controller may identify a port number mapped to the source address based on mapping information.

The DMA engine 611 (or the controller) may transmit the source address to the identified port. A CXL controller 642 of the memory pool 640 may receive the source address from the computer communication device 610.

In operation 603, the CXL controller 642 may translate from the source address to a device HDM address. As described above, since the source address is a host HDM address (indicating a position in a system of a system memory of the host 620), the CXL controller 642 may obtain the device HDM address indicating a position in a memory device through address translation.

In operation 604, the CXL controller 642 may send to the memory device 641a request for a value of a device HDM address. FIG. 6 shows an example memory pool (e.g., the memory pool 640) including memory devices 641a, 641b, 641c, and 641d. The CXL controller 642 may identify the memory device 641a from which reading is to be requested from among the memory devices 641*a*, 641*b*, 641*c*, and 641*d* of the memory pool 640 based on the translated device HDM address. For reference, a single memory device (e.g., the memory device 641*b*) may have one or more HDM areas, and multiple memory devices (e.g., the memory devices 641*c* and 641*d*) may form a single HDM area.

In operation 605, the CXL controller 642 of the memory pool 642 may read a value from the memory device 641*a*. The CXL controller 642 may transmit the read-value to the computer communication device 610.

In operation 606*a*, the DMA engine 611 may transmit the destination address to the controller of the computer communication device 610. In operation 606*b*, that controller may identify a corresponding port from the destination address, for example, by searching the mapping information for the destination address and selecting the port associated with the destination address in the mapping information.

In operation 607, the computer communication device 610 may transmit the destination address and the read-value to the identified port. A CXL controller 652 of the storage pool 650 may receive the destination address from the computer communication device 610.

In operation 608, the CXL controller 652 may translate the destination address to a device HDM address. As described above, since the destination address is a host HDM address indicating a position in the system of the system memory of the host 620, the CXL controller 652 may obtain the device HDM address (indicating a position in a storage device) through the address translation.

In operation 609, the CXL controller 652 may write the read-value. For example, the CXL controller 652 may write the value read in operations 604 and 605 for the device HDM address of the storage device 651*a*. As another example, in response to the CXL controller 652 transmitting the device HDM address along with the read-value to the storage device 651*a*, the storage device 651*a* may perform the write operation using the read-value at the device HDM address. Accordingly, data (or value) at a point corresponding to the source address in the memory device 641*a* may be copied and preserved into a point corresponding to the destination address in the storage device 651*a*.

For reference, FIG. 6 shows an example storage pool (e.g., the storage pool 640) including storage devices 651*a*, 651*b*, 651*c*, and 651*d*. The CXL controller 652 may identify the storage device 651*a* that is to perform writing among the storage devices 651*a*, 651*b*, 651*c*, and 651*d* of the storage pool 650 based on the translated device HDM address. For reference, a single storage device (e.g., the storage device 651*b*) may have one or more HDM areas, and a plurality of storage devices (e.g., the storage devices 651*c* and 651*d*) may form a single HDM area.

Additionally, in the storage pool 650, a point at which writing is to be performed in an HDM area of the storage device 651*a* may be identified, based on a translation (or conversion) of the device HDM address which is a byte address into a block address by the CXL controller 652.

Figure 7:
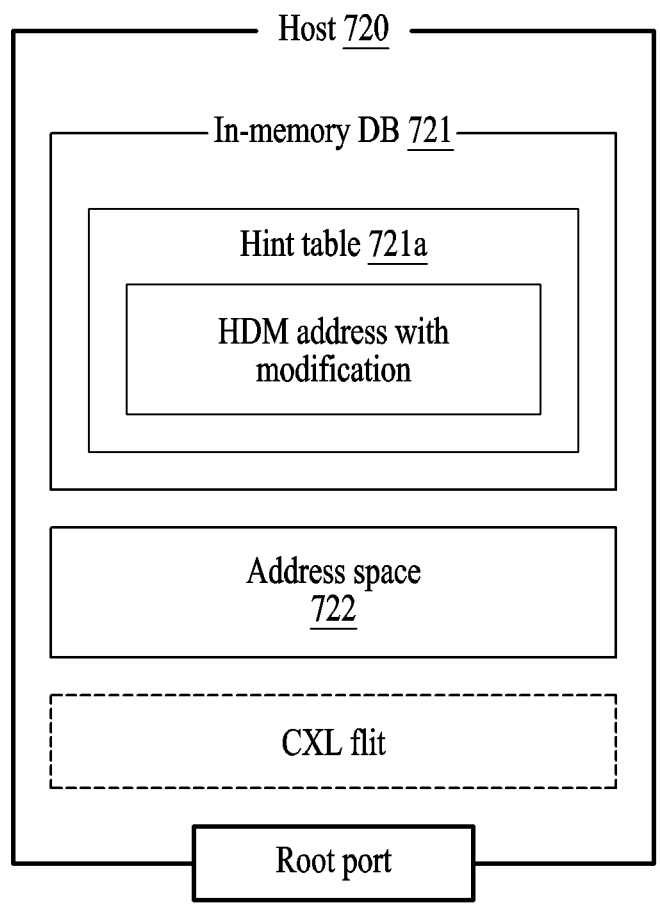
FIGS. 7 and 8 illustrate example snapshots using a hint table in an in-memory DB according to one or more example embodiments.
Figure 8:
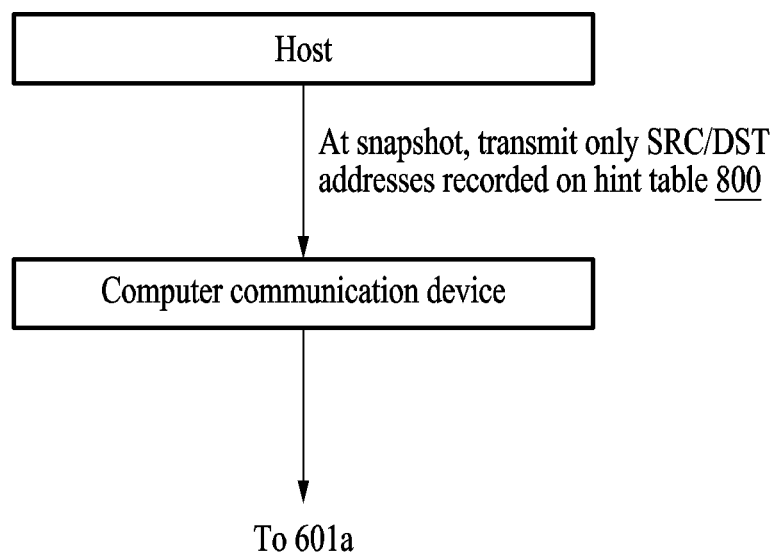

FIGS. 7 and 8 illustrate example snapshots using a hint table in an in-memory DB according to one or more example embodiments.

According to an example embodiment, a host 720 may further include a hint table 721*a* for an in-memory DB 721. An address space 722 is the same as the address space 422 of FIG. 4. The host 720 may manage the hint table 721*a*. The hint table 721*a* may include information about data changes between snapshots. For example, the hint table 721*a* may include a history of HDM addresses where modifications have occurred. In response to a data change from a previous snapshot (e.g., an immediately preceding snapshot) for the in-memory DB 721, the host 720 may record, in the hint table 721*a*, a modified HDM address that indicates a position where the data change has occurred. The modified HDM address may be an address that follows a system of a system memory of the host 720 (i.e., a host memory space).

Referring to FIG. 8, in operation 800, the host 720 may transmit only source addresses and destination addresses recorded in the hint table 721*a* for a snapshot of the in-memory DB 721. In other words, an incremental snapshot may be taken. For example, the host 720 may transmit, to a computer communication device, source information and destination information about a portion where a modification has occurred compared to a previous snapshot. A computing unit of the computer communication device may receive, from the host 720, the source information and the destination information about the portion where the modification has occurred compared to the previous snapshot. Instead of exchanging source information and destination information of all data within a predetermined range of an in-memory DB, the host 720 and the computer communication device may exchange only source information and destination information of a portion where a change has occurred compared to a previous snapshot. Accordingly, communication and/or computing resources between the host 720 and the computer communication device may be reduced.

Additionally, the host 720 may record single source information and single destination information about a portion where multiple modifications have occurred from a previous snapshot. In this way, even when data changes occur multiple times in the same host HDM address during a time interval from a time of a previous snapshot to a time of a current snapshot, it may require preserving only the data based on the time of the current snapshot. Therefore, it may not be necessary to record all the data changes occurring during the time interval from the time of the previous snapshot to the time of the current snapshot. For example, when a plurality of data changes (e.g., data insertion, modification, and deletion) occurs at any host HDM address, the host 720 may record only the corresponding host HDM address in the hint table 721*a*, regardless of the number of these changes. For example, the host 720 may generate and manage the hint table 721*a* as a hash table, thereby uniquely recording host HDM addresses where data changes have occurred without duplicating.

The host 720 may transmit, to the computer communication device, single source information and single destination information for each of modified portions compared to the previous snapshot. The single source information may include a single source address, and the single destination information may include a single destination address. The computer communication device may receive, from the host 720, the single source information and the single destination information for each of the modified portions compared to the previous snapshot. The computing unit of the computer communication device may transmit the source information and the destination information of the portion where the multiple modifications have occurred in the previous snapshot to a memory device and a storage device only once. The computer communication device may read a value corresponding to a source address of the memory device at the time of the current snapshot and write the read-value in an area corresponding to a destination address of the storage device. Therefore, for the portion where the multiple modifications have occurred, a value corresponding to a modification that is temporally closest to the time of the current snapshot may be preserved.

For example, the host 720 may initialize the hint table 721*a* based on a snapshot request (e.g., snapshot initiation) sent to the computer communication device. As described above, in the snapshot request, a pair (e.g., tuple) of a source address and a destination address associated with modifications occurring between a previous snapshot and a current snapshot may be transmitted to the computer communication device. Therefore, it is not necessary to keep the modifications occurring between the previous snapshot and the current snapshot in the hint table 721*a*. After the initialization, the host 720 may record, in the hint table 721*a*, new modifications (e.g., modifications after the current snapshot) occurring in the memory device. For reference, during a snapshot, an application activity for using the in-memory DB may be suspended (or, for example, a DB engine driving the in-memory DB may be suspended). In this case, no modifications may occur in the memory device during the snapshot. However, examples are not limited thereto, and the application may continue even during the snapshot. In this case, modifications may occur in the memory device even during the snapshot. The host 720 may record changes in the memory device in the hint table 721*a* even while a snapshot operation is performed in the computer communication device. For example, during a time between the initiation of the snapshot operation and the completion of the snapshot operation, a value of any source address may be preserved in a destination address of the storage device by the current snapshot, and then the value of the source address may be changed. As described above, the host 720 may record a new modification in the hint table 721*a*. The new modification to the source address may not be reflected in the current snapshot but in a next snapshot.

As described above, a computing system of an example embodiment may perform a snapshot (e.g., a partial snapshot or a delta snapshot) of a portion corresponding to changed data (e.g., data insertions, updates, and deletions), instead of a snapshot of all data. A write load on the storage device may be further reduced by peer-to-peer DMA. Therefore, the storage size may become smaller, and a snapshot cycle may be further reduced, and thus a possibility of losing the latest data (e.g., by power failure) may be further reduced. Although an example hint table (e.g., the hint table 721*a*) recording therein only addresses is mainly described herein, examples are not limited thereto, and operations corresponding to data changes (e.g., insertions, updates, and deletions) and values used for the data changes may also be stored together.

According to an example embodiment, the computing system may store only the history of operations (e.g., insert, update, and delete) that cause a data change. Accordingly, the size of the hint table 721*a* stored in the host 720 may be greatly reduced. The computing system may preserve values corresponding to the data change (e.g., delta snapshot or partial snapshot), instead of preserving all values in a memory area (e.g., full snapshot). Since even a partial snapshot does not preserve data values themselves in the form of a binary file, future restoration time may be minimized.

In contrast, in a second comparative example embodiment, for persistence, an operation causing a data change, a value used in the operation, and an address to which the change according to the operation is applied may be recorded. In the second comparative example embodiment, sequential execution of all commands (not just commands that write to an in-memory DB) according to a recorded operation history compared to a previous snapshot may restore data at the time of a last backup. Unlike the second comparative example embodiment, the computer communication device of an example embodiment may record only addresses corresponding to some commands and may therefore reduce a load of a write operation on the storage device. Additionally, only some changes are recorded, and thus the size of a snapshot file may also be reduced. Further, sequential execution of commands in a log file is not necessary for server restoration, and thus a time required for the server restoration may also be reduced. Therefore, the computing system of an example embodiment may provide faster server restoration with a smaller snapshot capacity (e.g., binary file capacity) compared to the second comparative example embodiment. This is because a server system only needs to read a binary file into a memory at the time of server restoration.

Figure 9:
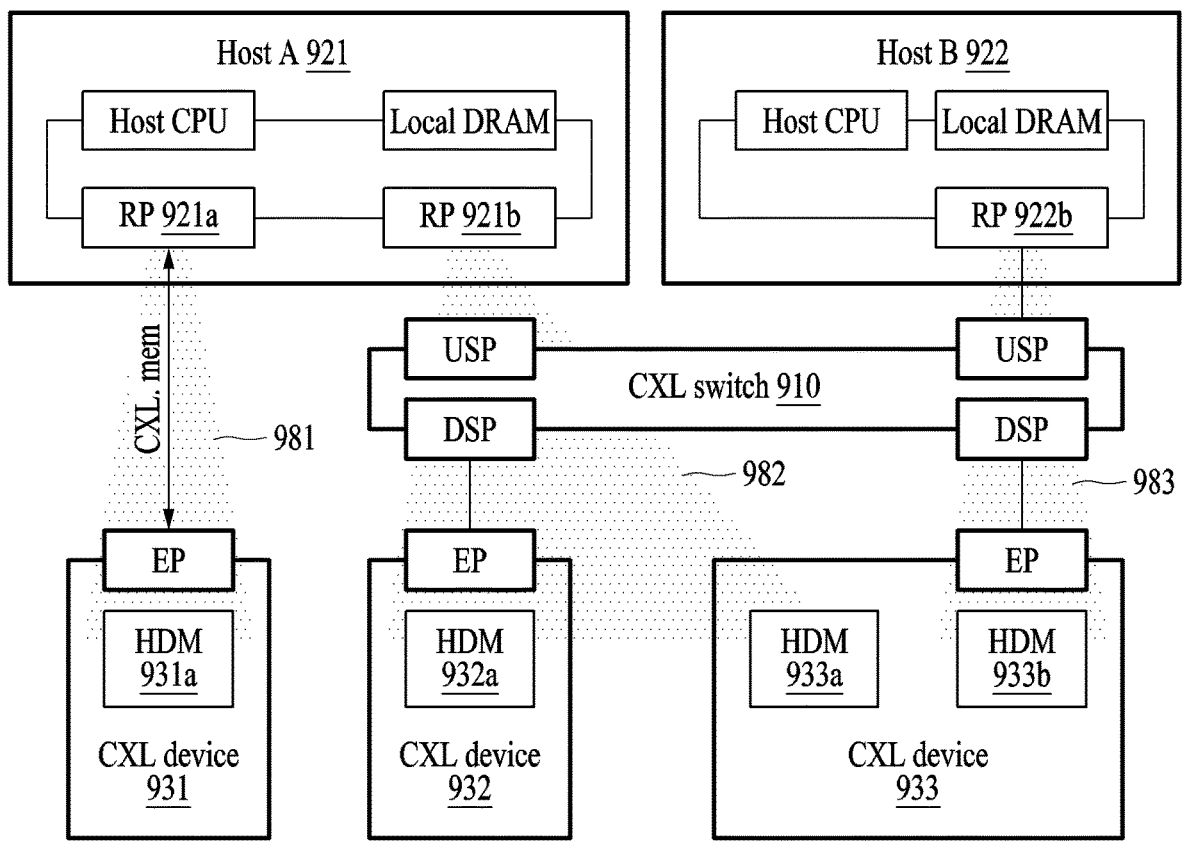
FIG. 9 illustrates an example server system including multiple hosts and multiple endpoint (EP) devices according to one or more example embodiments.

FIG. 9 illustrates an example server system including multiple hosts and multiple EP devices according to one or more example embodiments.

According to an example embodiment, a server system may provide a consistent in-memory DB even to multiple hosts and EP devices. A computer communication device may establish a CXL protocol-based connection among a set of hosts including a host, a set of memory devices including a memory device, and a set of storage devices including a storage device. The computer communication device may form virtual layers for root ports of the respective hosts. FIG. 9 shows a CXL switch 910 with an upstream port (USP) and a downstream port (DSP) as an example of the computer communication device.

For example, a host A 921 may have a root port 921*a* and a root port 921*b*, and a host B 922 may have a root port 922*b*. The CXL switch 910 may establish the CXL protocol-based connectivity between the host A 921 and the host B 922 and CXL devices 931, 932, and 933. As shown in FIG. 9, a first virtual layer 981 may be formed between the host A 921 and the CXL device 931. A second virtual layer 982 may be formed between the host A 921 and the CXL devices 932 and 933. A third virtual layer 983 may be formed between the host B 922 and the CXL device 933. The CXL device 933 may provide separate HDM areas 933*a* and 933*b* to different hosts. The CXL device 931 may provide an HDM area 931*a* to the host A 921, and the CXL device 932 may provide an HDM area 932*a* to the host A 921. However, since peer-to-peer communication is available only within a given virtual layer, devices belonging to the first virtual layer 981, devices belonging to the second virtual layer 982, and devices belonging to the third virtual layer 983 may not perform peer-to-peer communication with devices in virtual layers that they are not part of.

The CXL switch 910 may provide peer-to-peer communication between devices belonging to the second virtual layer 982 by performing the operations described above with reference to FIGS. 1 to 8. For example, in a case in which the CXL device 932 is a memory device and the CXL device 933 is a storage device, the host A 921 may drive an in-memory DB. The CXL switch 910 may copy a value of the HDM area 932*a* of the CXL device 932 into the HDM area 933*a* of the CXL device 933 using DMA, at a host's snapshot request.

Accordingly, in an environment with multiple memory pools and multiple storage pools, the CXL switch 910 may secure the persistence of the in-memory DB using DMA to the multiple memory pools and the multiple storage pools by multiple hosts.

Figure 10:
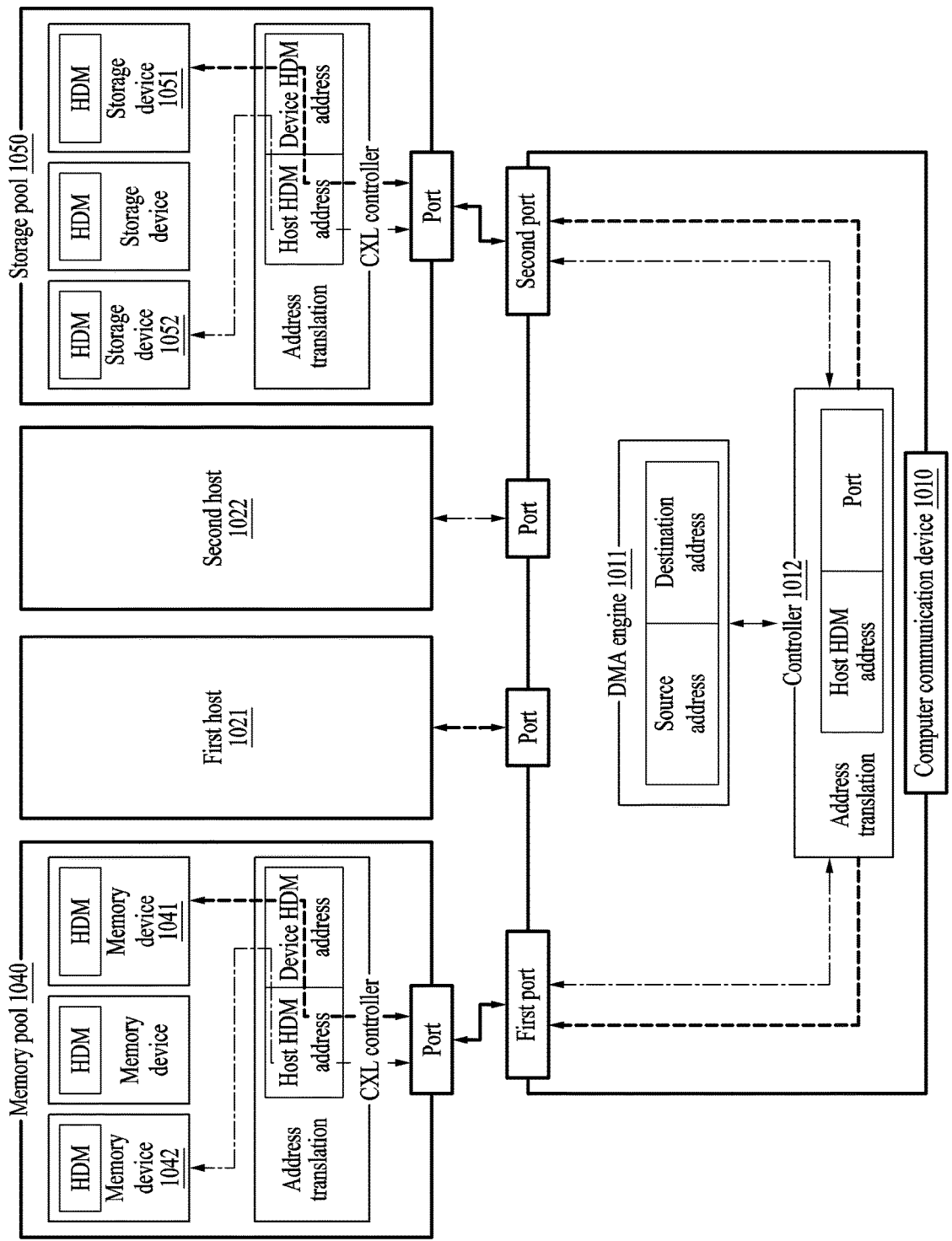
FIG. 10 illustrates example operations performed by multiple hosts according to one or more example embodiments.

FIG. 10 illustrates example operations performed by multiple hosts according to one or more example embodiments.

According to an example embodiment, a computing system may include multiple hosts. For example, a first host 1021 may transmit a first snapshot request to a computer communication device 1010. The computer communication device 1010 may perform operations accompanying a snapshot from a memory device 1041 of a memory pool 1040 to a storage device 1051 of a storage pool 1050 through a DMA engine 1011 and a controller 1012. Similarly, a second host 1022 may transmit a second snapshot request to the computer communication device 1010. The computer communication device 1010 may perform operations accompanying a snapshot from a memory device 1042 of the memory pool 1040 to a storage device 1052 of the storage pool 1050 through the DMA engine 1011 and the controller 1012.

Although an example of reading values from different memory areas by the first snapshot request and the second snapshot request and writing the read-values in different storage areas is described with reference to FIG. 10, examples are not limited thereto. The computer communication device 1010 may process the operations according to the snapshot requests from the hosts 1021 and 1022 in the requested order. In such a multi-host situation, the operations of each host, the computer communication device 1010, the memory pool 1040, and the storage pool 1050 are generally the same or similar to those described above with reference to FIGS. 1 to 9.

Figure 11:
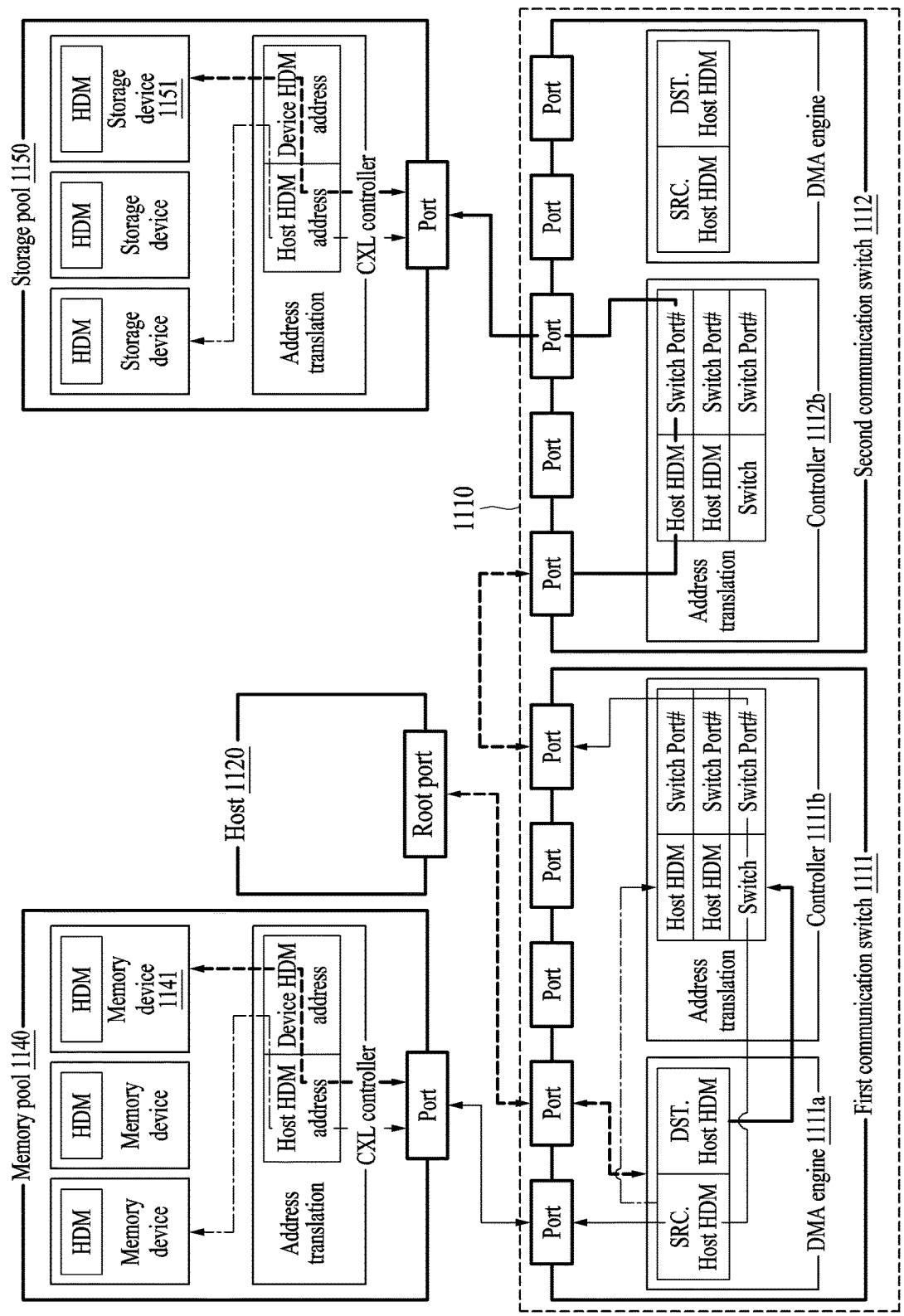
FIG. 11 illustrates an example computer communication device including a plurality of communication switches according to one or more example embodiments.

FIG. 11 illustrates an example computer communication device including a plurality of communication switches according to one or more example embodiments.

According to an example embodiment, a computer communication device 1110 may include a plurality of communication switches. Each of the communication switches may be a CXL switch, and the computer communication device 1110 including a plurality of CXL switches may be referred to as a CXL fabric.

The computer communication device 1110 may establish a CXL protocol via the plurality of communication switches for a host 1120, a memory device 1141, and a storage device 1151. FIG. 11 shows an example computer communication device (e.g., the computer communication device 1110) including a first communication switch 1111 and a second communication switch 1112. For example, a plurality of communication switches may be connected to each other, and a communication switch connected to a memory pool 1140 and a communication switch connected to a storage pool 1150 may be different from each other. In the example of FIG. 11, the first communication switch 1111 is a switch connected to the memory pool 1140 (e.g., the memory device 1141), and the second communication switch 1112 is a switch connected to the storage pool 1150 (e.g., the storage device 1151). A snapshot request from the host 1120 may be transferred between the first communication switch 1111 and the second communication switch 1112.

The first communication switch 1111 may receive the snapshot request from the host 1120. The host 1120 may have, in a system memory, information about an address of the memory device 1141 of the memory pool 1140 and information about an address of the storage device 1151 of the storage pool 1150. Accordingly, the host 1120 may transmit the snapshot request directly to a DMA engine 1111a of the first communication switch 1111 connected to the memory device 1141.

The first communication switch 1111 may obtain source information and destination information from the received snapshot request. The first communication switch 1111 may obtain a read-value of a memory area corresponding to the source information in the memory device 1141 through a port identified based on the source information. Since the first communication switch 1111 is connected to the memory pool 1140, it may read the value from the memory area of the memory device 1141 corresponding to a source address, as described above with reference to FIGS. 1 to 9. In this case, even when the first communication switch 1111 succeeds in translating the source address (and identifying a port thereof), it may fail in translating a destination address. Because, when the first communication switch 1111 is not directly connected to the storage pool 1150, mapping information of a controller 1111b of the first communication switch 1111 does not include HDM addresses of the storage device 1151. In this case, the first communication switch 1111 may not identify an HDM address of the storage device 1151.

The first communication switch 1111 may transmit such an unidentified address (e.g., the destination address) to another communication switch (e.g., the second communication switch 1112) connected to the first communication switch 1111. The first communication switch 1111 may transmit the previously read-value along with the destination information (e.g., the unidentified destination address) to the other communication switch. The first communication switch 1111 may request reading the value of the memory area corresponding to the source information using the DMA engine 1111a. The unidentified destination address may be repeatedly transmitted until it reaches the second communication switch 1112 connected to the corresponding storage pool 1150. For example, one or more third communication switches may transfer the unidentified destination address and the value read from the memory area from the first communication switch 1111 to the second communication switch 1112. The one or more third communication switches may be connected between the first communication switch 1111 and the second communication switch 1112. In response to the failure in the translation of the destination information, each of the one or more third communication switches may transmit the read-value and the destination information to another third communication switch.

The second communication switch 1112 may receive the read-value and the destination information. The second communication switch 1112 may identify port information (e.g., port number) of a port connected to the corresponding storage pool 1150 by translating the destination address. The second communication switch 1112 may transmit the read-value for a write operation of writing in a memory area corresponding to the destination information in the storage device 1151 to the storage device 1151 through the port identified based on the destination information.

In response to successful translation of the destination information using a controller 1112b, the second communication switch 1112 may transmit the read-value toward the storage device 1151 corresponding to the destination information. In this case, a DMA engine of the second communication switch 1112 may not intervene. The second communication switch 1112 may transmit the previously read-value to the storage pool 1150 through the identified port, thereby causing the write operation of writing the read-value in the memory area corresponding to the destination address.

For example, a DMA operation in the first communication switch 1111 may be processed by the DMA engine 1111a. The DMA engine 1111a may be specified by the host 1120 as described above. The second communication switch 1112 and the third communication switches may perform simple address translation and transmission (or transfer) of the destination information and the read-value. The first communication switch 1111 may transmit the read-value to another communication switch to cause the write operation of writing the read-value in the storage device 1151 without computing by the host 1120. The computer communication device 1110 may skip transmitting the read-value to the host 1120 and may repeat transfers of addresses and values between the communication switches until the read-value is transmitted to the storage device 1151.

Although it is illustrated in FIG. 11 that the first communication switch 1111 receives a snapshot request from the host 1120 for the convenience of description, examples are not limited thereto. For example, the host 1120 may also transmit the snapshot request to the second communication switch 1112. In this example, since the second communication switch 1112 is not connected to the memory device 1141 corresponding to the source address, it may fail in translation (e.g., port identification) of the source address. The second communication switch 1112 may transmit the unidentified source address to another communication switch connected to the second communication switch 1112. The unidentified source address may be repeatedly transmitted until it reaches the first communication switch 1111 connected to the memory pool 1140 corresponding to the source address. When a value corresponding to the source address is read, the read-value and the destination address may be repeatedly transmitted until they reach the second communication switch 1112 connected to the storage pool 1150 corresponding to the destination address. For another example, the first communication switch 1111 or the second communication switch 1112 may receive the snapshot request from the host 1120 via a separate communication switch (e.g., a fourth communication switch).

The computing apparatuses, the vehicles, the electronic devices, the processors, the memories, the displays, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blueray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A computer communication device, comprising:
   ports connected to a host, a storage device belonging to a same virtual layer as the host, and a memory device;
   a memory storing mapping information indicating associations between the ports and host-managed device memory (HDM) addresses; and
   a computing unit configured to:
   receive, from the host, source information and destination information for a snapshot from the host,
   based on the mapping information and the source information, obtain a read-value of a memory area corresponding to the source information from the memory device through a port identified, and
   transmit the obtained read-value for a write operation of writing in a memory area corresponding to the destination information in the storage device, based on peer-to-peer communication, to the storage device through a port identified based on the mapping information and the destination information.

2. The computer communication device of claim 1, configured to establish a compute express link (CXL)-based connectivity for the host, the memory device, and the storage device.

3. The computer communication device of claim 1, wherein the computing unit comprises:
   a controller configured to identify, among the plurality of ports, a first port from source information including an HDM address and a second port from destination information including an HDM address, based on the mapping information; and
   a direct memory access (DMA) engine configured to perform DMA by transmitting the source information to the first port identified by the controller, obtaining the read-value from the memory device, and transmitting the read-value along with the destination information to the second port identified by the controller.

4. The computer communication device of claim 1, wherein the computing unit is further configured to:
   transmit the read-value to the storage device to cause the write operation of writing the read-value in the storage device without computing by the host.

5. The computer communication device of claim 1, wherein the computing unit is further configured to:
   skip transmitting the read-value to the host; and
   transmit the read-value directly to the storage device.

6. The computer communication device of claim 1, wherein the memory device stores an in-memory database (DB) that includes the data read, and wherein the computing unit is further configured to:
   receive, from the host, source information and destination information about a portion that is modified compared to a previous snapshot of the in-memory DB.

7. The computer communication device of claim 1, configured to receive, from the host, single source information and single destination information for each of portions that are modified compared to a previous snapshot of an in-memory DB stored in the memory device.

8. The computer communication device of claim 1, wherein the computing unit is configured to:
   transmit only once, to the memory device and the storage device, source information and destination information of a portion with multiple modifications to a previous snapshot of an in-memory DB stored in the memory device.

9. The computer communication device of claim 1, configured to:
   establish a CXL protocol-based connectivity to a plurality of hosts comprising the host, a plurality of memory devices comprising the memory device, and a plurality of storage devices comprising the storage device; and
   form a virtual layer for each of root ports of the plurality of hosts.

10. The computer communication device of claim 1, wherein the source information comprises a source HDM address in a memory address space of a system memory of the host, and
    the destination information comprises a destination HDM address in the memory address space of the system memory of the host.

11. A computing system, comprising:
    a host;
    a storage device belonging to a same virtual layer as the host;
    a memory device storing an in-memory database (DB), the memory device belonging to the virtual layer; and a computer communication device configured to process a data transfer between the memory device and the storage device, wherein the memory device and the storage device are connected with each other and the host through ports of the computer communication device, wherein the computer communication device is configured to:

receive, from the host, source information and destination information for a snapshot;

determine that a first of the ports is associated with the source information in mapping information that comprises associations between the ports and host-managed device memory (HDM) addresses;

obtain a read-value of a memory area corresponding to the source information from the memory device through the determined first port;

determine that a second of the ports is associated with the destination information in the mapping information; and transmit the read-value for a write operation of writing in a memory area, in the storage device, that corresponds to the destination information, wherein the transmitting is based on peer-to-peer communication, to the storage device through the determined second port.

12. The computing system of claim 11, wherein the host, the storage device, and the memory device are configured to communicate with the computer communication device through a compute express link (CXL)-based protocol, wherein the source information and destination information are received via CXL communication, and wherein the read-value is obtained and transmitted via CXL communications.

13. The computing system of claim 11, wherein the computer communication device is further configured to:

determine the first port from an HDM address of the source information and determine the second port an HDM address of the destination information, based on corresponding associations in the mapping information;

transmit the source information to the first port and obtain the read-value from the memory device; and transmit the read-value along with the destination information to the second port to performing direct memory access (DMA).

14. The computing system of claim 11, wherein the computer communication device is further configured to:

transmit the read-value to the storage device to cause the write operation of writing the read-value in the storage device without the host receiving the read-value.

15. The computing system of claim 11, wherein the computer communication device is further configured to:

not transmit the read-value to the host; and transmit the read-value directly to the storage device.

16. The computing system of claim 11, wherein the host is configured to:

transmit, to the computer communication device, source information and destination information about a portion that is modified compared to a previous snapshot.

17. The computing system of claim 11, wherein the host is configured to:

transmit, to the computer communication device, single source information and single destination information for each of portions that are modified compared to a previous snapshot.

18. The computing system of claim 11, wherein the computer communication device is a CXL switch and wherein the host, the computer communication device, the memory device, and the storage device are all part of a CXL virtual layer having a root port corresponding to the host.

19. The computing system of claim 11, wherein the computer communication device is further configured to:

establish a CXL protocol-based connectivity for a set of hosts that includes the host, a set of memory devices that includes the memory device, and a set of storage devices that includes the storage device; and form virtual layers for root ports of the hosts, respectively, in the set of hosts.

20. A method performed by a computing unit, comprising:

receiving, from a host, source information and destination information for a data copy, the host belonging to a same virtual layer as a memory device and a storage device;

obtaining a read-value of a memory area corresponding to the source information from the memory device through a port identified based on the source information and mapping information between ports of a computer communication device and host-managed device memory (HDM) addresses; and transmitting the read-value for a write operation of writing in a memory area corresponding to the destination information in the storage device, based on peer-to-peer communication, to the storage device through a port identified based on the mapping information and the destination information.

21. A computer communication system, comprising:

a first communication switch connected to a memory device, and configured to obtain source information and destination information for a data copy requested by a host, obtain a read-value of a memory area corresponding to the source information in the memory device through a port identified based on the source information, and transmit the read-value and the destination information to a second communication switch; and the second communication switch connected to a storage device, and configured to receive the read-value and the destination information and transmit the read-value for a write operation of writing in a memory area corresponding to the destination information in the storage device to the storage device through a port identified based on the destination information.

22. The computer communication system of claim 21, wherein the first communication switch is further configured to:

transmit the read-value and the destination information to the second communication switch in response to an unsuccessful translation of the destination information.

23. The computer communication system of claim 21, wherein the first communication switch is further configured to:

request reading a value of the memory area corresponding to the source information using a direct memory access (DMA) engine.

24. The computer communication system of claim 21, wherein the second communication switch is configured to:

transmit the read-value toward the storage device corresponding to the destination information in response to a successful translation of the destination information by the second communication switch.

25. The computer communication system of claim 21, further comprising:

one or more third communication switches connected between the first communication switch and the second communication switch.

26. The computer communication system of claim 25, wherein each of the one or more third communication switches is configured to:
   in response to an unsuccessful translation of the destination information, transmit the read-value and the destination information to another of the third communication switches.

27. The computer communication system of claim 21, configured to:
   establish a compute express link (CXL)-based protocol via the plurality of communication switches for the host, the memory device, and the storage device.

28. The computer communication system of claim 21, wherein the first communication switch is further configured to:
   transmit the read-value to the other communication switch to cause the write operation of writing the read-value in the storage device without computing by the host.

29. The computer communication system of claim 21, further configured to:
   not transmit the read-value to the host; and
   repeat transfers of addresses and values between communication switches until the read-value is transmitted to the storage device.

* * * * *